US008205575B2

(12) United States Patent
Nicastle

(10) Patent No.: US 8,205,575 B2
(45) Date of Patent: Jun. 26, 2012

(54) PARTICULATE COLLECTOR FOR LIQUID CONTAINMENT SYSTEM

(76) Inventor: Larry P. Nicastle, Wellington, CO (US)

(*) Notice: Subject to any disclaimer, the term of this patent is extended or adjusted under 35 U.S.C. 154(b) by 1127 days.

(21) Appl. No.: 12/079,379

(22) Filed: Mar. 26, 2008

(65) Prior Publication Data

US 2008/0237153 A1 Oct. 2, 2008

Related U.S. Application Data

(60) Provisional application No. 60/921,369, filed on Apr. 2, 2007.

(51) Int. Cl.
*A01K 7/00* (2006.01)
*B01D 37/00* (2006.01)
(52) U.S. Cl. ............... 119/72; 119/74; 210/767
(58) Field of Classification Search .................. None
See application file for complete search history.

(56) References Cited

U.S. PATENT DOCUMENTS

| | | | |
|---|---|---|---|
| 587,559 A * | 8/1897 | Riley ............................. 4/289 |
| 1,451,206 A * | 4/1923 | Dow .............................. 24/543 |
| 1,455,989 A * | 5/1923 | Carmichael ................. 137/434 |
| 1,624,276 A * | 4/1927 | Nelson ......................... 210/495 |
| 1,633,150 A * | 6/1927 | Wieben .......................... 119/73 |
| 1,688,751 A * | 10/1928 | Schnitger ...................... 248/94 |
| 1,711,949 A * | 5/1929 | Keppler ...................... 210/464 |
| 1,839,595 A * | 1/1932 | Ritchie ......................... 119/73 |
| 1,899,519 A * | 2/1933 | Neilsen ......................... 119/72 |
| 2,015,087 A * | 9/1935 | Rafton .......................... 209/403 |
| 2,250,646 A * | 7/1941 | Metsch ........................ 210/475 |
| 2,315,842 A * | 4/1943 | Dariano ....................... 210/474 |
| 2,716,423 A * | 8/1955 | Landgraft .................... 137/408 |
| 3,027,872 A * | 4/1962 | Nelson .......................... 119/81 |
| 3,368,580 A * | 2/1968 | Carter .......................... 137/412 |
| 3,384,109 A * | 5/1968 | Stroburg et al. ............. 137/434 |
| 3,581,710 A * | 6/1971 | Van Gilst ....................... 119/78 |
| 4,066,557 A * | 1/1978 | Banoczi ....................... 210/470 |
| 4,286,546 A * | 9/1981 | Moore ....................... 119/61.54 |
| 4,309,962 A * | 1/1982 | Boozer .......................... 119/74 |
| 4,584,966 A * | 4/1986 | Moore ........................... 119/73 |
| 4,655,171 A * | 4/1987 | Tomasovich .................. 119/73 |
| 4,804,470 A * | 2/1989 | Calvillo et al. .............. 210/232 |
| 4,946,591 A * | 8/1990 | Mealey ........................ 210/474 |
| 4,955,322 A * | 9/1990 | Rodriguez ..................... 119/78 |
| 5,059,319 A * | 10/1991 | Welsh .......................... 210/232 |
| 5,174,245 A * | 12/1992 | Bishop .......................... 119/73 |
| 5,186,828 A * | 2/1993 | Mankin ....................... 210/232 |
| 5,219,006 A * | 6/1993 | Bishop ........................... 141/1 |
| 5,368,728 A * | 11/1994 | Reaves ........................ 210/232 |
| 5,377,621 A * | 1/1995 | Camm ...................... 119/61.54 |
| 5,672,271 A * | 9/1997 | Dye ......................... 210/167.12 |
| 5,738,786 A * | 4/1998 | Winnington-Ingram ..... 210/474 |
| 5,853,581 A * | 12/1998 | Rayborn et al. ............. 210/241 |

(Continued)

OTHER PUBLICATIONS

U.S. Appl. No. 60/921,369, filed Apr. 2, 2007, entitled "Particulate Collector for Liquid Containment System".

*Primary Examiner* — Robert James Popovics
(74) *Attorney, Agent, or Firm* — Craig R. Miles; CR Miles, P.C.

(57) ABSTRACT

A particulate collector configured to engage a container proximate to the container perimeter and which can disengage from the perimeter of the container to collect particulate accumulated in an amount liquid in the container.

3 Claims, 3 Drawing Sheets

U.S. PATENT DOCUMENTS

| | | | | |
|---|---|---|---|---|
| 5,887,544 A * | 3/1999 | Popelier | | 119/61.54 |
| 5,914,036 A * | 6/1999 | Sullivan, Jr. | | 210/232 |
| 5,935,435 A * | 8/1999 | Hasler | | 210/232 |
| 6,126,018 A * | 10/2000 | Cone et al. | | 210/469 |
| 6,149,808 A * | 11/2000 | Johnson et al. | | 210/242.1 |
| 6,274,036 B1 * | 8/2001 | Ellis | | 210/164 |
| 6,314,911 B1 * | 11/2001 | Kaytovich | | 119/61.5 |
| 6,436,286 B1 * | 8/2002 | Scott | | 210/232 |
| 6,623,634 B1 * | 9/2003 | Whitehurst | | 210/186 |
| 6,685,843 B2 * | 2/2004 | Leaverton | | 210/805 |
| 6,797,164 B2 * | 9/2004 | Leaverton | | 210/167.12 |
| 6,878,266 B2 * | 4/2005 | Leaverton | | 210/167.12 |
| 6,939,463 B2 * | 9/2005 | Leaverton | | 210/167.12 |
| 7,600,486 B2 * | 10/2009 | Ellis | | 119/61.5 |
| 7,681,526 B2 * | 3/2010 | Roes et al. | | 119/72.5 |
| 7,753,000 B1 * | 7/2010 | Turner | | 119/61.2 |
| 7,975,649 B2 * | 7/2011 | Barker | | 119/75 |
| 8,082,882 B1 * | 12/2011 | Tharp | | 119/60 |
| 2003/0094423 A1 * | 5/2003 | Leaverton | | 210/767 |
| 2003/0205537 A1 * | 11/2003 | Leaverton | | 210/767 |
| 2004/0104163 A1 * | 6/2004 | Leaverton | | 210/448 |
| 2004/0231608 A1 * | 11/2004 | Grace-Kellogg | | 119/72 |
| 2007/0199512 A1 * | 8/2007 | Ellis | | 119/61.54 |
| 2008/0237153 A1 * | 10/2008 | Nicastle | | 210/806 |
| 2009/0169756 A1 * | 7/2009 | Joosten | | 427/421.1 |
| 2010/0180827 A1 * | 7/2010 | Becattini et al. | | 119/61.54 |

* cited by examiner

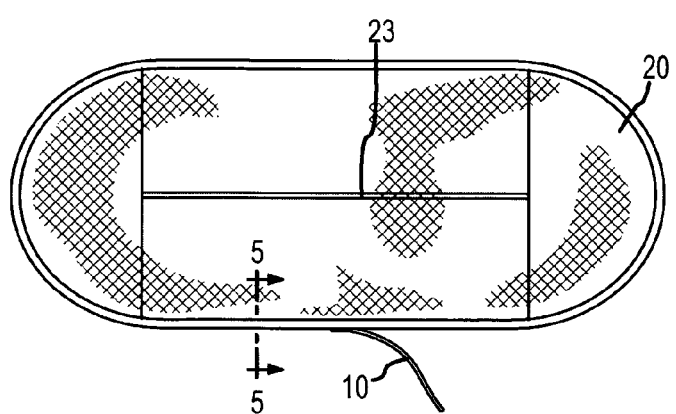
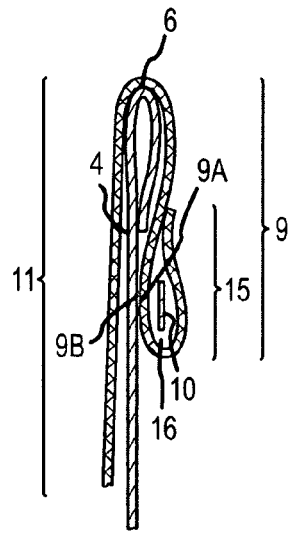
FIG.2  FIG.5
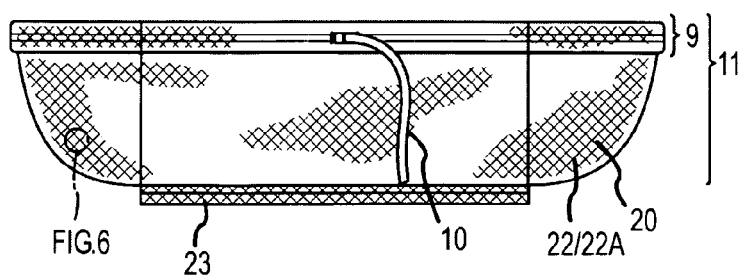
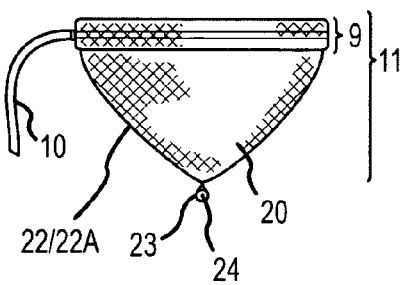
FIG.3  FIG.4
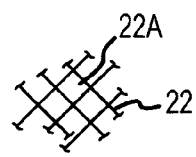
FIG.6

US 8,205,575 B2

PARTICULATE COLLECTOR FOR LIQUID CONTAINMENT SYSTEM

I. BACKGROUND

A particulate collector configured to engage a container proximate to the container perimeter and which can disengage from the perimeter of the container to collect particulate accumulated in an amount liquid in the container.

A long felt, but unresolved need, associated with the care of animals can be maintaining water held in containers free of particulates. Conventional care of animals typically involves providing a container which can be filled with water from which the animal drinks. Typically, the container has no cover to protect the amount of water inside the container from becoming associated or mixed with particulates from outside of the container which travel to become located inside of the container. The accumulated particulate is typically removed from container by turning the container over or opening a container aperture through which the water and associated particulate can egress from the container. The container aperture can then be closed or the container turned upright to receive a fresh amount of water free of the undesirable particulate. These conventional approaches to containing an amount of water free of undesirable particulate from which animals can drink requires allocation of substantial physical effort and time and can be a waste of water.

The inventive particulate collector addresses this long felt but unresolved problem of removing accumulated particulate from the amount of liquid in a container.

II. SUMMARY OF THE INVENTION

Accordingly, a broad object of the invention can be to provide a particulate collector which engages a container proximate to the container perimeter (also referred to as the lip of the container mouth) and which disengages the perimeter of the container to collect particulate accumulated in the amount liquid in the container.

Another broad object of the invention can be a particulate collector configured to provide a first part which engages a container proximate to the container perimeter and a second part which locates a sufficient distance beneath the surface of an amount of liquid in the container to generate a reservoir of water from which an animal can drink.

Naturally, further objects of the invention are disclosed throughout other areas of the specification, drawings, photographs, and claims.

III. A BRIEF DESCRIPTION OF THE DRAWINGS

FIG. 2 is a top view of a particular embodiment of the inventive particulate collector.

FIG. 3 is a side view of a particular embodiment of the inventive particulate collector.

FIG. 4 is an end view of a particular embodiment of inventive particulate collector.

FIG. 5 is a cross section view 5-5 of the first particulate collector part of a particular embodiment of the inventive particulate collector.

FIG. 6 is an enlarged view of a part of the second particulate collector part of a particular embodiment of the inventive particulate collector.

IV. DETAILED DESCRIPTION OF THE PREFERRED EMBODIMENTS

A particulate collector configured to engage a container proximate to the container perimeter and which can disengage from the perimeter of the container to collect particulate accumulated in an amount liquid in the container.

Figure 1:
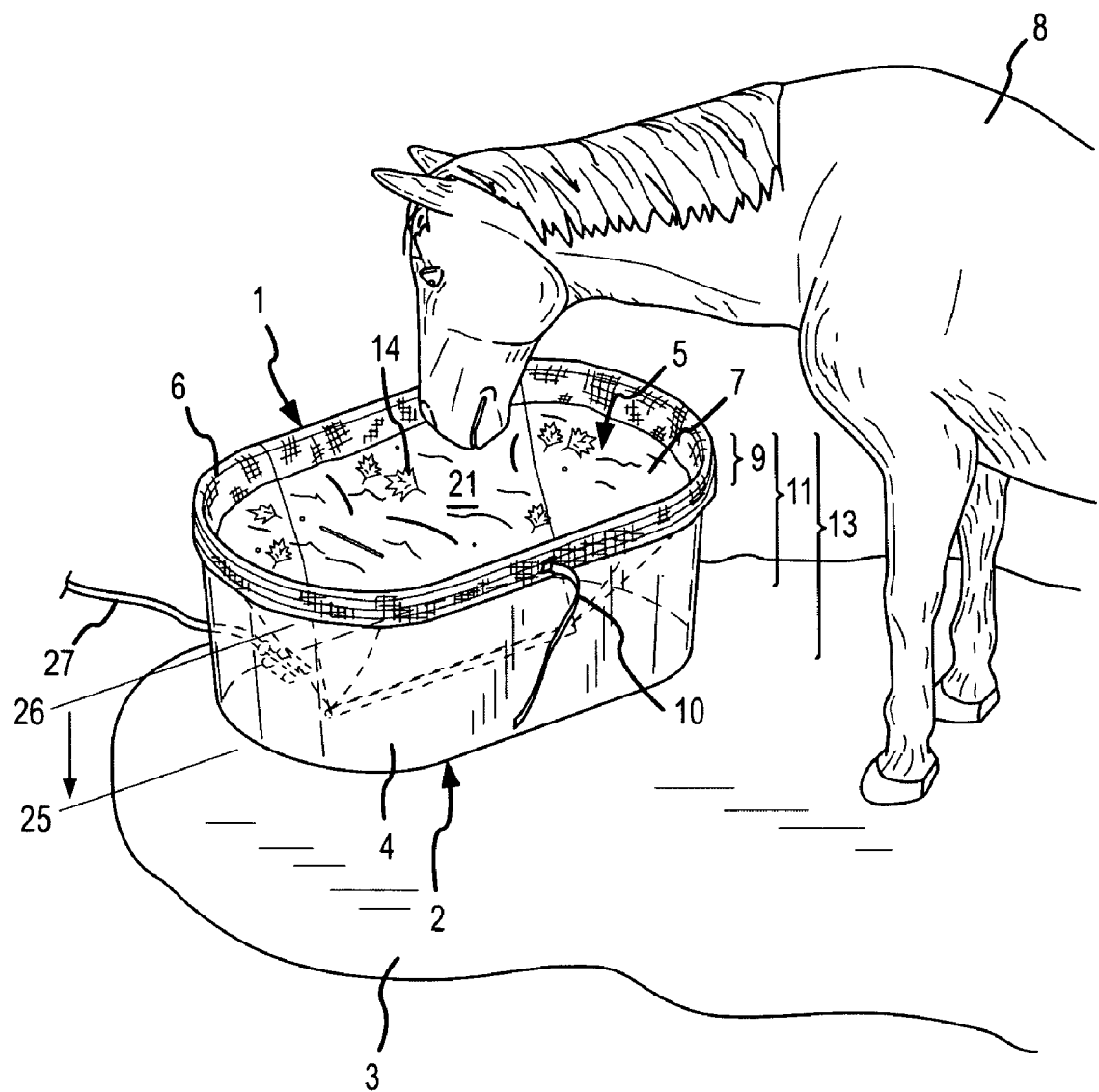
FIG. 1 shows a particular method of using the inventive particulate collector.
Figure 7:
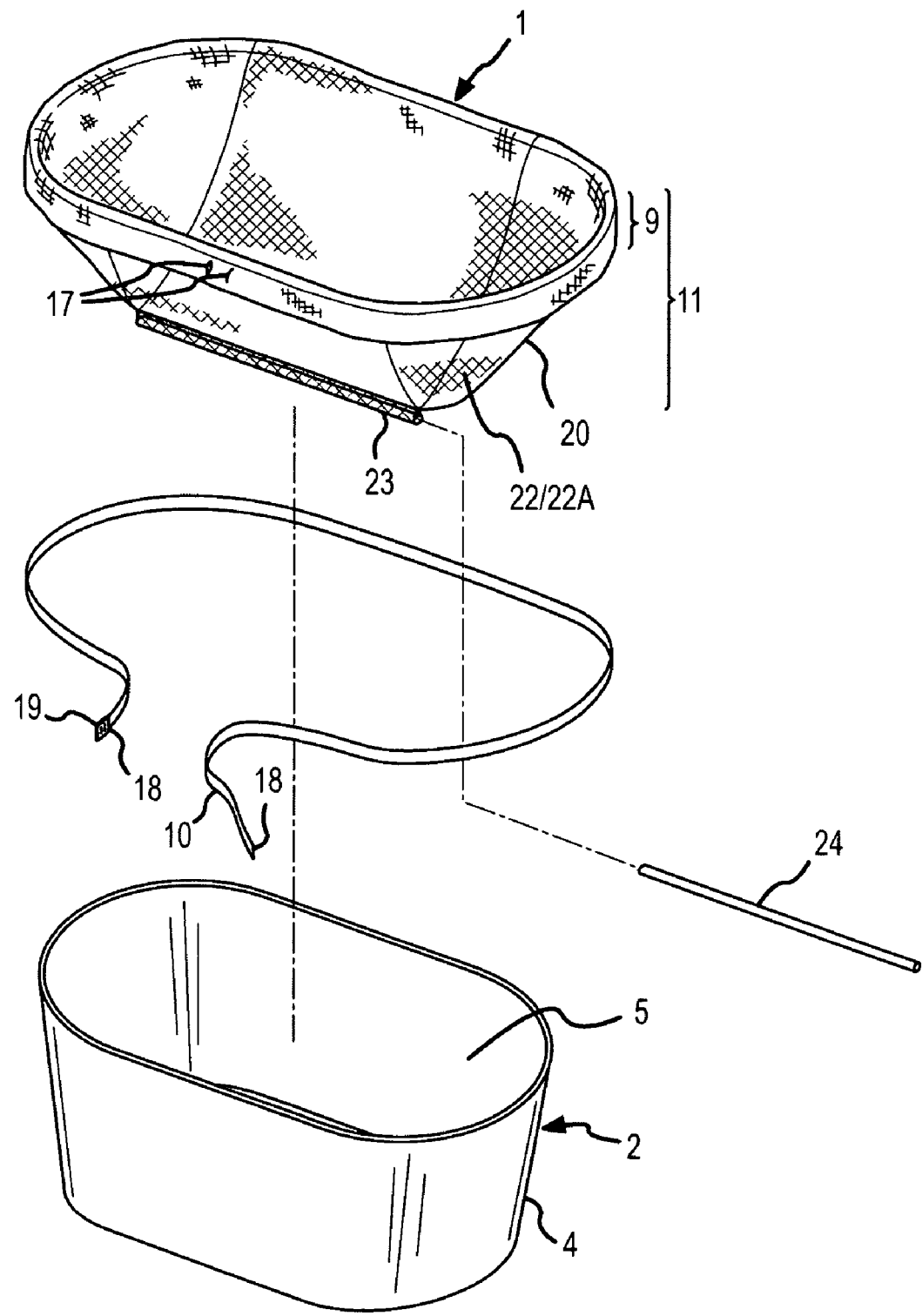
FIG. 7 is an exploded view of a particular embodiment of the inventive particulate collector.

First referring primarily to FIG. 1, a particular method of using an embodiment of a particulate collector (1) is shown. In a first step, a container (2) can be established at a location on a support surface (3). The container (2) can be any configuration having a container wall (4) (which can be integral with a container bottom or a discrete container wall (4) joined to a discrete container bottom) which terminates in a container perimeter element (6) (see also FIG. 5) defining an inside space (5) of the container (2) capable of containing an amount of liquid (7) from which an animal (8) can drink. While the container (2) shown has an oval configuration, the invention is not so limited, and the container (2) can be any of numerous and varied configurations including as examples: circular, oval, diamond, rectangular, square without limitation to any particular size or height. The container (2) can further include conventional heater elements (27), aerators, filters, or the like.

In a second step, a first particulate collector part (9) can be located to engage a part of the outside surface of the container wall (4) proximate to the container perimeter element (6) (also referred to as the lip of the container mouth). While engagement of the first particulate collector part (9) with the outside surface of the container wall (4) typically occurs at a location in the upper third of the container wall (12), the invention is not so limited and certain embodiments of the inventive particulate collector (1) can provide a first particulate collector part (9) which can engage the outside surface of the container wall (4) at any location along the container height (13).

In a third step, the first particulate collector part (9) can be fixedly secured at a location on the outside surface of the container wall (4) by adjustment of a flexible securement element (10) which forcibly urges a surface of the first particulate collector part (9) against the outside surface of the container wall (4). The term "fixedly secured" for the purposes of this invention means that the first particulate collector part (9) has a surface sufficiently forcibly engaged with the outside surface of the container wall (4) such that it will not travel so far as to disengage from the container wall (4) although the location of the engaged surface of the first particulate collector part (9) may travel to a limited extent.

In a fourth step, a second particulate collector part (11) (see also FIG. 3) can be located a distance beneath the surface of a liquid (7) contained within the inside space (5) of the container (1) to produce a reservoir space (21) filled with the liquid (7) sufficient to allow an animal (8) to drink from the container (2) with the particulate collector (1) engaged as above-described. While the animal shown by FIG. 1 is a horse, it is not intended that the particulate collector (1) be limited to equine applications and the animal (8) can be any of numerous and varied animals such as cattle, horses, burros, ostriches, mules, donkeys, dogs, cats, chickens, turkeys, or the like. Understandably, the second particulate collector part (11) can be located within the inside space (5) of the container (1) which is subsequently filled with a liquid. The term "liquid" for the purposes of this invention typically means water or water mixed with a medicinal or nutritional supplement for animals; however, the invention is not so limited and the term liquid depending on the application in which the invention is utilized can mean any liquid that can be located within a container (4).

Subsequently, an amount of particulate (14) can become associated or mixed with the amount of liquid (7) contained within the reservoir space (21) defined by the second particulate collector part (11) located within the inside space (5) of the container (1). The term "particulate" broadly encompasses any manner of material such as leaves, grass, hay, sticks, stones, hair, grain, animal feed, insects, insect parts, insect larva, insect eggs, mosquito larva, whether in whole or in part, or a combination thereof.

In a fifth step, the first particulate collector part (9) can be disengaged from the outside surface of the container wall (4). The particulate collector (1) including the first particulate collector part (9) and the second collector part (11) can removed from the container (2). The amount of particulate (14) mixed with the amount of liquid (7) contained in the inside space (5) of the container (1) can become engaged with the particulate collector (1) during removal of the particulate collector (1) from the container (1). This allows separation of the amount of particulate (14) from the amount of liquid (7) in the container (2).

In a sixth step, the amount of particulate (14) can be disengaged from the particulate collector (1) and the particulate collector (1) reengaged with the container (2) as above described.

Now referring primarily to FIGS. 2-6, a particular embodiment of the particulate collector (1) can be configured to provide a first particulate collector part (9) and a second particulate collector part (11). Now referring primarily to FIG. 5, the first particulate collector part (9) can be configured to provide a surface (9A) which circumferentially engages a part of an outside surface (9B) of the container wall (4) of the container (2). As to certain embodiments of the particle collector (1), the first particulate collector part (9) can provide a single layer of flexible material or plurality of layers of flexible material configured to engage a part of the outside surface (9B) of the container wall (4) and the perimeter element (6) (or lip of the mouth of the container (1) in a manner which without securement establishes the location the first particulate collector part (9) relative to the container perimeter element (6). As to other embodiments of the particle collector (1), the first particulate collector part (9) can provide a resiliently stretchable material whether as one layer or a plurality layers which retracts to forcibly engage a surface (9A) of the resiliently flexible material against a part of the outside surface (9B) of the container wall (4). Yet as to other non-limiting embodiments of the particulate collector (9) as shown in FIGS. 2-6, the first particulate collector part (9) can provide a flexible conduit (15). The flexible conduit (15) provides a passage (16) in which to establish a securement element (10). The securement element (10) can be a resilient stretchable element which can be established in the passage (16) which allows the surface (9A) of the first particulate collector part (9) to increase in length as it is engaged with the part of outside surface (9B) of the container wall (4) and decrease in length to forcibly engage the surface (9A) of the first particulate collector part (9) with the part of the outside surface (9B) of the container wall (4).

A conduit aperture (17) (see primarily FIG. 6), or a plurality of conduit apertures, allow communication with the passage (16) provided by the flexible conduit (15). As to certain embodiments of the particulate collector (1), as shown by FIGS. 2-6, the securement element (10) can be configured as a flexible band (or other flexible configuration such as a cord, a wire, a strap, or the like) which can be established in the passage (16) of the flexible conduit (15) with the pair of opposed ends (18) extended from the conduit aperture (17). A mechanical fastener (19) can engage each of the pair of opposed ends (18) to allow variable length adjustment of the flexible strap. Variable adjustment of the flexible band adjusts the length of the circumference of the first particulate collector part (9) and correspondingly adjusts the amount of force applied by the surface (9A) of the flexible conduit (15) against the part of the outside surface (9B) of the container wall (4). An advantage of the embodiment of the particulate collector shown by FIGS. 2-6 can be that the circumference of the first particulate collector part (9) can be adjusted over a wider range than other embodiments of the particle collector (1) allowing one configuration of the particle collector (1) to engage numerous and varied configurations of the container (2).

Again referring to FIGS. 2-4, the various embodiments of the particle collector (1) further include a second particle collector part (11). The second particle collector part (11) can provides as one embodiment of the invention a net (20) coupled to the first particulate collector part (9). Certain embodiments of the net (20) can be connected by a continuous seam or can be integral with the first particulate collector part (9). The net (20) can have a configuration which can locate within the inside space (5) of the container (2). While the inventive particle collector (1) does not limit the net (20) to any particular configuration and can provide numerous and varied configurations to locate within the inside space (5) of correspondingly numerous and varied configurations of containers (1), as to each embodiment of the particle collector, it is intended that a part of the net (20) have a configuration which locates a sufficient distance (25) (see FIG. 1) beneath the surface (26) of the amount of liquid (7) to provide a reservoir of liquid (21) (see FIG. 1) within the net sufficiently large to allow an animal (8) to drink from the reservoir of liquid (21) defined by the configuration of the net (20). In the particular embodiments of the inventive particulate collector (1) shown in the Figures, the second particle collector part (11) can provide a net (20) configured in a pocket like form which hangs from the first particulate collector part (9) a distance (25) into the inside space (5) of the container (1). As to certain embodiments of the particle collector (1) the net (20) can be configured to hang in the inside space (5) about one-half or two thirds the distance of the container height (13) from the perimeter element (9) to define the reservoir of liquid (21). The net (20) can be made from a wide variety of net materials a net, a web, a mesh, or the like. Understandably, the term "net" can encompass any mesh, web, net, or the like generated from a plurality of flexible fibers interconnected to produce a plurality of apertures (22) or generated by perforating a flexible sheet material to produce the plurality of apertures (22). The flexible fibers can be of numerous and varied constructional form such as braided strands, twisted strands, or individual fibers of plastic, metal, polysteel, or the like, individually or used in various combinations and permutations. The flexible sheet material can be for example a cloth or plastic sheet material. Each of the plurality of apertures (22) will typically have an open space (22A) sufficiently large for a part of the amount of liquid (7) contained in the reservoir of liquid (21) to pass through while concurrently having an open space (22A) sufficiently small to retain, upon removal of the net (20) from the inside space (5) of the container (2), at least part of the amount of particulate (14) accumulated in the reservoir of liquid (21).

Now referring primarily to FIGS. 3, 4, and 5, the inventive particulate collector (1) can further include a load retainer

(23) and a load (24) coupled by the load retainer (23) to the second collector part (11). The load (24) operates to offset the buoyant effect of the amount of water (7) on the portion of the second particle collector part (11) submerged beneath the amount of water (7). This maintains the second particulate collector part (11) in a configuration which defines the reservoir space (21) from the inside space (5) inside the container (1) from which an animal (8) can drink. As to certain embodiments of the inventive particulate collector, the load retainer (23) can be configured as an elongated pocket in which a load (24) configured as a length of rod can be located. This configuration of the load retainer (23) and the load (24) can provide an advantage when the particle collector (1) has greater length than width. However, the load retainer (23) and the load (24) are not limited to the constructional form shown in the Figures and the load retainer (23) and the load (24) can take any constructional form which operates to offset all or a portion of the buoyant effect of the amount of water (7) on the second particulate collector part (11). As to certain embodiments of the particle collector (1) in which the second collector part (11) has sufficient mass to offset the buoyant effect, the load retainer (23) and the load (24) may not be necessary elements of the particle collector (1).

As can be easily understood from the foregoing, the basic concepts of the present invention may be embodied in a variety of ways. The invention involves numerous and varied embodiments of particle collector and methods of making and using such embodiments of the particle collector.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "collector" should be understood to encompass disclosure of the act of "collecting"—whether explicitly discussed or not—and, conversely, were there effectively disclosure of the act of "collecting", such a disclosure should be understood to encompass disclosure of a "collector" and even a "means for collecting." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of the particle collector devices or systems herein disclosed and described, ii) the related methods disclosed and described, iii) similar, equivalent, and even implicit variations of each of these devices and methods iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A method for watering animals, comprising:
a) circumferentially engaging a first collector part on an outside surface of a container proximate to a lip of a container mouth and installing a second particulate collector part coupled to said first collector part within an inside space of said container, and wherein said second particulate collector part provides a plurality of apertures which fluidically communicate between a first surface and a second surface of said second particulate collector part said apertures sufficiently large to allow an amount of liquid to pass through said second particulate collector part said apertures sufficiently small to retain an amount of particulate entrained in said amount of liquid on said first surface as said liquid passes through said second particulate collector part, said second particulate collector part producing a reservoir space within said container sufficient to allow and animal to drink from said container;

retaining a load to said second particulate part, said load having sufficient mass to offset the buoyancy of said second particulate collector in said liquid; and b) permitting one or more animals to drink water from said reservoir space.

2. The method for watering animals of claim 1, further comprising the step of disengaging said first particulate collector part from said outside surface of said container.

3. The method for watering animals of claim 2, further comprising the step of removing said second particulate collector part from said inside space of said container which allows said amount of water within said reservoir space to pass through said plurality of apertures of said second particulate collector part collecting said amount of particulate on said first surface of said second particulate collector part.

* * * * *